United States Patent [19]
Shrader

[11] 3,919,913
[45] Nov. 18, 1975

[54] METHOD AND APPARATUS FOR IMPROVING MUSICAL ABILITY

[76] Inventor: David L. Shrader, 11810 NE. 141st St., Kirkland, Wash. 93033

[22] Filed: Apr. 15, 1974

[21] Appl. No.: 460,781

Related U.S. Application Data

[60] Division of Ser. No. 294,525, Oct. 3, 1972, Pat. No. 3,808,936, which is a continuation of Ser. No. 53,081, July 8, 1970, abandoned.

[52] U.S. Cl. .................................. 84/454; 84/470
[51] Int. Cl.² .................................. G10G 7/02
[58] Field of Search ............... 84/454, 464, 470–478; 35/8–9, 14

[56] References Cited
UNITED STATES PATENTS

| | | | |
|---|---|---|---|
| 2,123,258 | 7/1938 | Ranger | 84/470 |
| 2,207,450 | 7/1940 | Bergan et al. | 84/454 |
| 2,341,222 | 2/1944 | Lancaster | 35/14 |
| 2,416,353 | 2/1947 | Shipman et al. | 84/470 X |
| 2,919,620 | 1/1960 | Dorf | 84/454 |
| 2,958,250 | 11/1960 | Poehler | 84/454 |
| 3,144,802 | 8/1964 | Faber et al. | 84/454 |
| 3,163,077 | 12/1964 | Shank | 84/464 |
| 3,180,199 | 4/1965 | Anderson | 84/454 |
| 3,456,546 | 7/1969 | Welsh et al. | 84/478 |
| 3,482,480 | 12/1969 | Decker | 84/478 |
| 3,537,190 | 11/1970 | Serrell et al. | 35/9 |
| 3,598,889 | 8/1971 | Switsen | 84/464 X |
| 3,631,756 | 1/1972 | Mackworth-Young | 84/454 |

*Primary Examiner*—Lawrence R. Franklin
*Attorney, Agent, or Firm*—Klarquist, Sparkman, Campbell, Leigh, Hall & Whinston

[57] ABSTRACT

A pair of recordings are synchronously reproduced, wherein one such recording suitably comprises a musical selection with which a student may correlate a response, while the second recording represents an ideal or correct response. The student hears the first recording continuously, but the second recording becomes audible to him only at the instance of his response coinciding with the information on the second recording. The student is thus given an immediate indication of the correctness of his response for the purpose of reinforcing the student's performance. Also, an overall indication or summary is provided of the student's ability.

2 Claims, 6 Drawing Figures

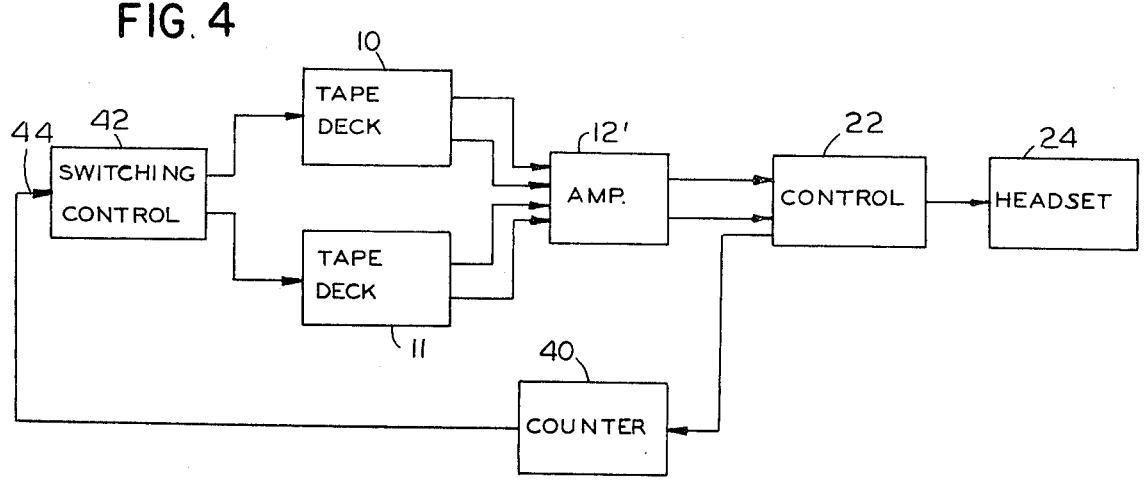
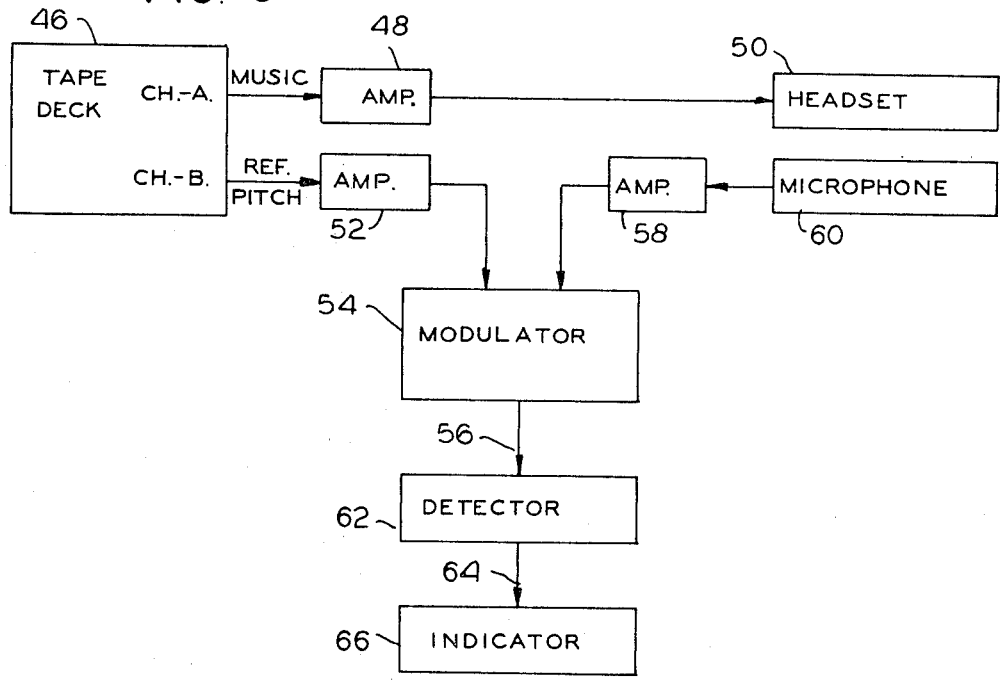

METHOD AND APPARATUS FOR IMPROVING MUSICAL ABILITY

This is a division of application Ser. No. 294,525 filed Oct. 3, 1972, now Pat. No. 3,808,936 which is a continuation of Ser. No. 53,081 filed July 8, 1970 now abandoned.

BACKGROUND OF THE INVENTION

Evaluation of musical performance and ability, e.g. in the area of rhythm and pitch, has heretofore been largely subjective. Even with the ideal one-to-one teacher-pupil ratio, the emphasis is still upon teacher interpretation, and the ability of the teacher to convey the proper corrective suggestion to the student. Despite the recognition that greater learning takes place with immediate reinforcement or rejection of student action, the complication and variations involved in music render the student's specific actions difficult to isolate. Often, only an overall impression can be gained of the relative ability or inability of a particular student, and evaluation of performance is most often delayed.

SUMMARY OF THE INVENTION

According to the present invention, first and second audio signals are simultaneously provided, for example from a pair of tracks on a single recording tape. The first audio signal comprises a sound sequence, such as a musical selection or the like, with which the student can correlate a response. For example, it may be desired the student respond rhythmically to the "beat" or "tempo" of the music, and the student may also be provided with sheet music for sight reading.

According to the present invention, a substantially immediate indication is given of the student's correct response. For example, in case a rhythmic response is called for, the student will hear the second audio signal, comprising a correctly synchronized rhythmic beat, only insofar as his response coincides therewith. The student's correct performance is thus reinforced. Also, a summary or score of the student's overall performance is suitably provided.

As a result of the immediate reinforcement of the student's correct action, the learning process is accelerated as compared with a subjective evaluation after the student's performance. The student also enjoys the illusion of "playing" with the music or sound sequence which comprises the first audio signal.

It is accordingly an object of the present invention to provide an improved method and apparatus for ascertaining and improving a student's musical ability.

It is another object of the present invention to provide improved method and apparatus for improving a student's musical ability by immediate reinforcement of correct action.

It is a further object of the present invention to provide an improved method and apparatus for ascertaining and improving a student's rhythmic ability.

It is another object of the present invention to provide an improved method and apparatus for improving a student's pitch.

It is a further object of the present invention to provide an improved learning method and apparatus which provides the illusion of playing an instrument.

The subject matter which I regard as my invention is particularly pointed out and distinctly claimed in the concluding portion of this specification. The invention, however, both as to organization and method of operation, together with further advantages and objects hereof, may best be understood by reference to the following description taken in connection with the accompanying drawings wherein like reference characters refer to like elements.

DRAWINGS

FIG. 1 is a block diagram of a first apparatus according to the present invention for ascertaining and improving rhythmic ability, FIG. 2 is a representation of magnetic tape employed with the FIG. 1 apparatus, illustrating incorrect student response relative thereto, FIG. 3 is another representation of the same recording tape, this time illustrating a correct student response, FIG. 4 is a block diagram of an apparatus according to the present invention for switching taped programs according to the rhythmic ability of a particular student, FIG. 5 is a block diagram of apparatus according to the present invention for ascertaining and improving a student's pitch, and FIG. 6 is a schematic diagram further illustrating exemplary circuitry employed in the apparatus shown in block diagram form in FIG. 1.

DETAILED DESCRIPTION

Figure 1:
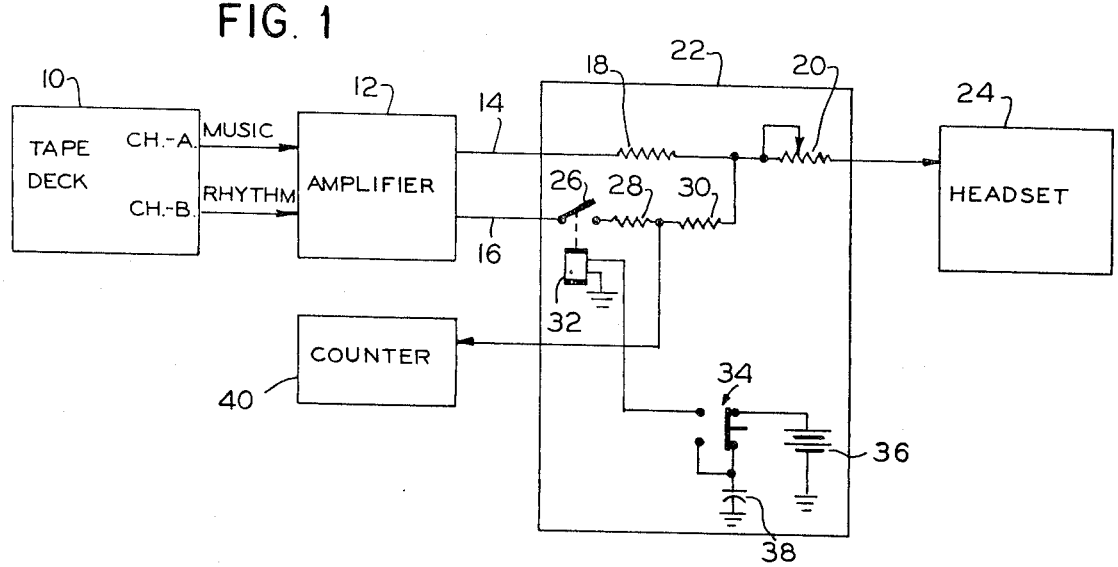

Referring to the drawings and particularly to FIG. 1, the apparatus therein illustrated is employed for evaluating and improving the rhythmic ability of a student. Tape deck 10 is a conventional magnetic tape recording and reproducing apparatus having the facility of simultaneously reproducing plural channels of recorded magnetic tape. For example, tape deck 10 may comprise a "stereo" tape player, wherein the two channels are designated channel A and channel B respectively. Channel A is suitably recorded with a substantially continuous sound, or series of sounds, constituting an audio sound sequence. The usual and possibly most satisfactory recording will be that of a musical selection having a discernible "beat" or "tempo." However, some other natural or artificial sound sequence may be substituted therefor, such as the ticking of a metronome at a predetermined rate.

Channel B, on the other hand, is recorded to reproduce the correct beat or tempo audio signal which would normally also be associated with channel A, and which should be recognized by the student. That is, the channel B audio signal is correlated with the first sound sequence in the same manner as a student's correct rhythmic response to the channel A sound sequence. In a particular instance, the channel B or rhythm channel comprised a recording of a small muted membraneaphone or bongo drum played in correct time with the channel A music.

Channel A and B audio signals from tape deck 10 are both coupled to a stereo amplifier 12 which produces separate amplified outputs 14 and 16 corresponding to the music and rhythm respectively. The music signal is substantially continuously coupled to headset 24 via series connected resistor 18 and variable resistor 20 in control unit 22. The rhythm signal is selectively coupled via control unit 22 to headset 24, with this signal being provided through relay contacts 26 and resistors 28 and 30, connected in series, to the junction of the aforementioned resistors 18 and 20. However, contacts 26 are normally open, inasmuch as relay coil 32 is normally not energized, and therefore the rhythm channel will normally not be heard in the headset.

Control unit 22 also includes a double throw push button 34 which is mechanically biased in a conventional manner for normally closing the right hand contacts thereof. These contacts couple a battery 36 in charging relation to capacitor 38. The student can momentarily depress push button 34, closing the left hand contacts, and when the student does so, capacitor 38, theretofore charged by battery 36, will discharge through relay coil 32 and cause momentarily closing of relay contacts 26. The circuit comprising the relay coil, the capacitor, and the battery constitute a timing circuit by means of which the rhythm channel, i.e. channel B is temporarily coupled to headset 24 for a predetermined short period of time. The discharge time constant of the capacitor 38, relay coil 32 circuit is suitably such that relay contacts 26 are held closed for approximately one tenth of a second, each time push button 34 is depressed. The student will therefore hear whatever is recorded on channel B only for such short period of time and must release the push button for recharging capacitor 38 before another segment of channel B can be heard by him.

A counter 40, comprising a conventional electromechanical counter, receives its input at the junction between resistors 28 and 30. The counter 40 is threshold operated such that if a rhythm signal is present when contacts 26 are closed, electronic circuitry in the counter 40 will amplify such information and increase the total registered count by one.

Figure 2:
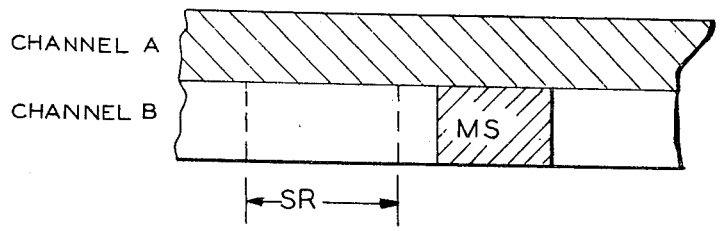

The operation achieved according to the present invention can be illustrated by visually depicting the placement of the magnetic signals on a magnetic "stereo" tape. Referring to FIGS. 2 and 3, channel A again represents a sound sequence or music channel, while channel B indicates the rhythm channel. Channel A is suitably continuously recorded and is continuously heard by the student via the aforementioned headset 24 worn by the student. However, Channel B may or may not be heard. Channel B is prerecorded with magnetic signals, MS, e.g. recording a membraneaphone beat, wherein each signal is correlated with the natural beat of the recorded music, with each signal suitably having a duration of somewhat less than one tenth of a second. Period SR depicts the student's response, or the period of time relay contacts 26 are closed after button 34 is depressed. The student attempts to operate the push button in time with the music he hears, and sometimes additionally in accordance with sheet music provided. In the instance illustrated in FIG. 2, the student's response does not coincide with a prerecorded magnetic signal, and hence signal MS would not be heard by the student in headset 24.

Figure 3:
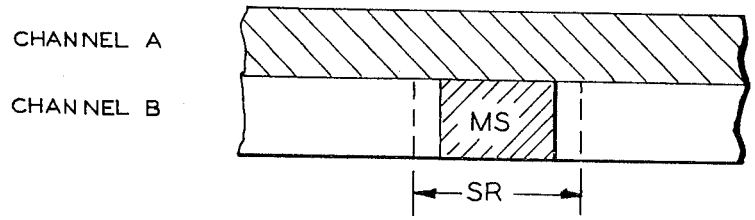

In FIG. 3 on the other hand, the student has matched his response, SR, with the magnetic signal MS, indicative of correct timing. Therefore, the student will hear the signal MS in his headset.

Of course, if the student almost but not quite matches the desired signal, MS, only a part of the recorded signal will be heard. In a given instance, the "gate" period constituting the period SR during which the student may hear channel B, can be made quite short and the signal MS can be made quite short in order to lessen the chance of overlap. In any case, the student can detect the difference between a correctly timed response and one that is not.

The student quickly receives reinforcement of correct rhythmic response with the method carried out by the apparatus FIG. 1, and can rapidly adjust his response so that he hears a greater proportion of the recorded rhythmic signals. Also, the student gains the illusion of "playing" the programmed rhythm, accompanying the music on channel A as his response is correct. Learning can rapidly take place with this system.

Other modes of operation for the FIG. 1 apparatus are possible. For example, the FIG. 1 apparatus may be operated in a reverse mode wherein the rhythmic signal is heard continuously except when a correct response is given by the student. A circuit including means for accomplishing the reverse mode is described below. However, this type of reinforcement has not been found as satisfactory in practice as the first mode described above.

Counter 40 registers the number of rhythmic beats which the student successfully identifies by means of push button 34. With successive runs of the same tape or different tapes, the student and his instructor can identify the student's learning progress. The rating obtained thereby is entirely objective and provides a clear cut index of the particular student's rhythmic and/or sight reading ability.

FIG. 4 illustrates an apparatus wherein the student, by his ability, can "branch-program" the apparatus to a different or more complex test of rhythm. In the FIG. 4 diagram, similar elements are referred by means of similar reference numerals. In addition, the apparatus is provided with a second tape deck, 11, which is connected to dual channel amplifier 12' substantially in parallel with the output from tape deck 10. However, tape decks 10 and 11 are controlled by a switching control 42 whereby only one of the tape decks is operated at a particular time. The input 44 to switching control 42 is compared with a threshold in switching control 42 whereby, if the output of counter 40 exceeds a given number, switching control 42 is actuated to discontinue operation of tape deck 10 and initiate operation of tape deck 11. Tape deck 11 generally records a musical selection with a more complex rhythm component or the like, which is thus selected when the student exceeds a given overall "score" with the tape deck 10 recorded information. The student is thereby given an automatic and accurately gauged incentive to progress.

The apparatus as hereinbefore described relates primarily to methods and means for ascertaining and improving a student's temporal acuity or tempo. However, the same general method and related apparatus are suitable for ascertaining and improving other aspects of the student's musical ability besides rhythm. Referring to FIG. 5, apparatus is illustrated for ascertaining a student's pitch and providing immediate reinforcement of student performance in the case of correct response. In FIG. 5, tape deck 46 comprises a conventional tape recording and reproducing apparatus, e.g. suitably of the "stereo" type, reproducing music on channel A and a reference pitch on channel B. Again, channel B represents sound information which is correlated with the music signal on channel A and represents the desired or accurate student response. The channel A information is amplified by means of amplifier 48 and is supplied to headset 50. A reference pitch from channel B is amplified by means of an amplifier 52 and is then provided as a first input signal for modulator 54, the latter comprising a mixing or intermodulating circuit for supplying a beat frequency output at 56 comprising the frequency difference of the input signals applied to the modulator. The remaining input to modulator 54 is supplied through amplifier 58 from a microphone 60. If the inputs from amplifiers 52 and 58 to modulator 54 are identical in frequency, then a zero frequency output is present at output lead 56.

The output at 56 is supplied to a detector 62 including a high pass filter followed by rectifying means for providing an output at 64 only when the difference between the signals from amplifiers 52 and 58 exceeds a predetermined frequency value. Indicator 66, suitably comprising a volume unit or decibel meter, will register an output only when the frequency difference exceeds the predetermined amount. An indication is thereby given when the student's pitch is incorrect. Alternatively, the output of detector 62 is suitably inverted whereby indication is given by indicator means 66 only in the absence of an output from detector 62. In the latter case an indication is provided as a consequence of the student's correct response.

The student wearing headset 50, will play a musical instrument or sing into microphone 60, e.g. employing sheet music. So long as the pitch of the response provided by the student is close to the reference pitch, the detector 64 will provide no output, assuming a non-inverted output thereof is utilized. However, as the student's response varies from the reference pitch, appropriate indication will be given. Here again, as in the instance of the devices of FIGS. 1 and 4, the student obtains substantially immediate reinforcement of correct or incorrect response and can, of course, take immediate corrective action in order to improve his performance. Although not shown in FIG. 5, a counting means may be employed to indicate, for example, the number of instances in which the student's response was incorrect. Moreover, the reference pitch may be applied to the headset, if desired, when, and for as long as the student's response is correct, or the reference pitch may be supplied to the headset in the event the student's response is incorrect.

Figure 6:
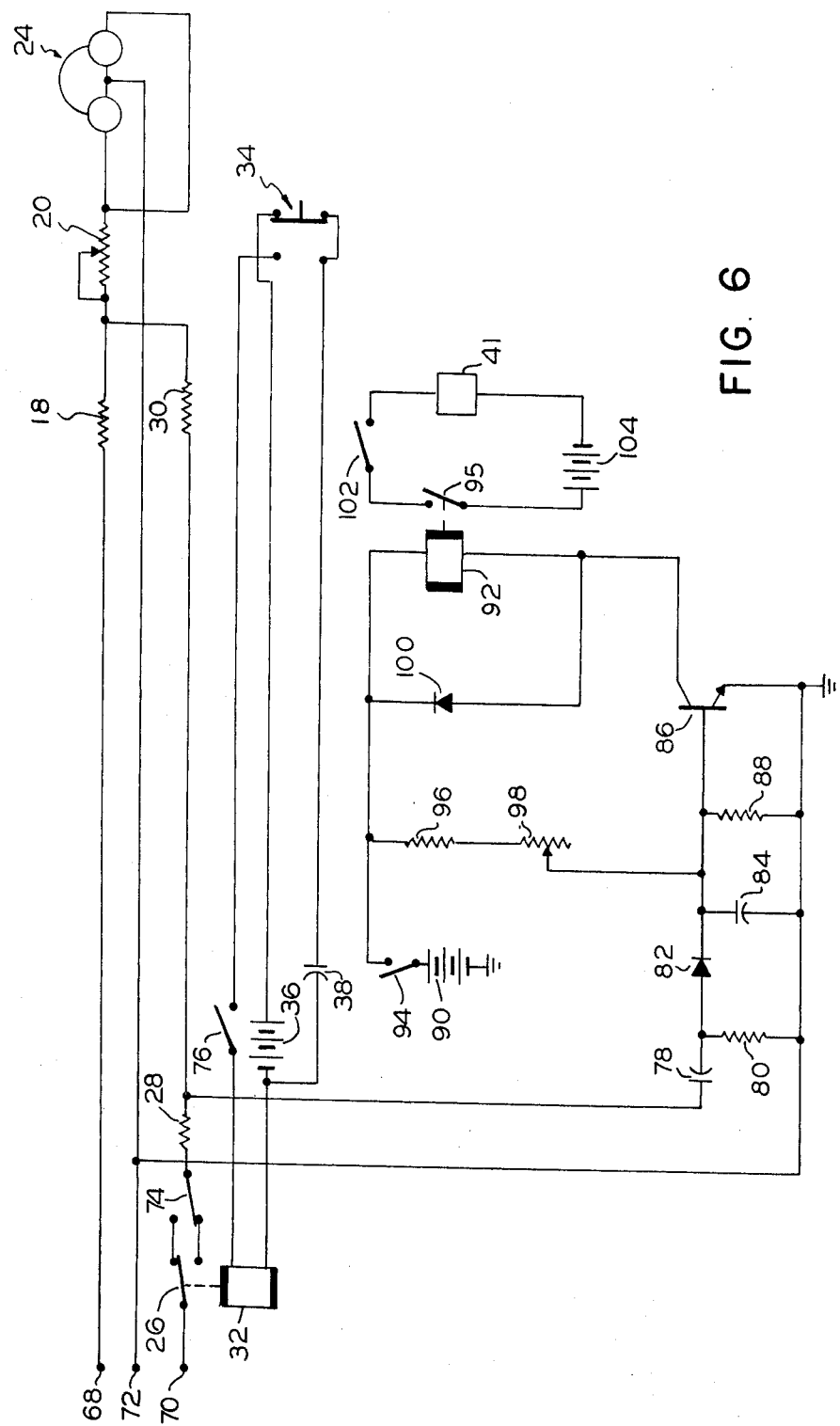

FIG. 6 is a schematic diagram illustrating a portion of the FIG. 1 system in greater detail. In particular, portions of control unit 22 and counter 40 are disclosed in a more detailed manner. It is understood this circuitry is exemplary only and mechanical relays and the like may be replaced with entirely solid state circuitry, if so desired.

Referring to FIG. 6, terminals 68 and 70 are audio signal input terminals for receiving outputs 14 and 16 of amplifier 12 in FIG. 1, while terminal 72 is a common return or ground. Terminal 68 is coupled through resistors 18 and 20 in series to first terminals of headset 24, with resistor 20 being variable for adjusting the volume of the channel A audio information as heard in the headset. Terminal 70 is coupled by way of the relay contacts 26, switch 74, and resistors 28 and 30 in series to the junction between resistors 18 and 20. In FIG. 6, relay contacts 26 are illustrated as double-throw, and switch 74 is employed to make a selection therebetween. The position of the switch 74 illustrated in FIG. 6 corresponds to the circuit as has been described in connection with FIG. 1, whereby energization of relay coil 32 closes contact 26 and also delivers channel B from terminal 70 headset 24. However, switch 74 may alternatively be thrown to its upper position whereby the channel B signal will be heard continuously in headset 24 except when the proper response is made by the student. The circuit therefore enables the "reverse mode" mentioned above. A switch 76 is also provided in series with relay coil 32 for disabling the latter entirely.

The circuitry including battery 36, capacitor 38, and relay coil 32, together with push button 34, operates as a timing circuit in the manner hereinbefore described. The period of time for which relay coil 32 will close contacts 26 for each depression of push button 34 is readily determined by selection of the value of capacitor 38. In a particular embodiment, capacitor 36 had a value of 50 microfarads, the relay comprised a Potter-Brunfield type RS5D, and battery 36 comprised a 24-volt DC source. This combination provides an approximately one-tenth second closure of contacts 26, after which contacts 26 return to the normal position shown.

The remainder of the circuit illustrated in FIG. 6 comprises a portion of counter 40 in FIG. 1. The junction between resistors 28 and 30 is coupled by means of a capacitor 78 to a first terminal of an input resistor 80, the opposite terminal of which is returned to ground terminal 72. Diode 82 is interposed between the first terminal of resistor 80 and a filter capacitor 84, the latter also having its opposite terminal returned to ground. The diode 82, capacitor 84 circuit detects or rectifies such magnetic signals, MS, as are provided via resistor 28 when contacts 26 close, and are detectable.

The junction of capacitor 84 and the cathode of diode 82 is coupled to the base of MPW transistor 84, having its emitter returned to ground and having an input resistor 88 disposed between the base thereof and ground. The collector of transistor 86 connects to the positive terminal of supply battery 90 through relay coil 92 and power switch 94. When a signal, MS, is received and rectified by diode 82, transistor 86 amplifies the same and draws current from battery 90 through relay coil 92, closing contacts 94 of the relay. The series combination of resistor 96 and variable resistor 98, connected from the junction of switch 94 and relay coil 92 to the base of transistor 86, comprises an adjustable biasing circuit for transistor 86. Diode 100 disposed across relay coil 92 is employed for absorbing the voltage generated across relay coil 92 by collapse of the field thereof at the end signal MS.

Relay contacts 95 are disposed in series with switch 102, electrically mechanical counter 41, and battery 104. Each time the signal, MS, occurs, relay contacts 95 close and cause electrically operated mechanical counter 41 to increase its indicated numerical output by one digit. This, of course, assumes switch 102 is closed. Mechanical counter 41 thereby provides an accurate indication of the number of correct responses by the student.

If switch 74 is thrown to its upper position, counter 41 will provide an output count indicating all but the correct responses by the student since the signal, MS, will cause actuation of relay coil 92 when the student does not eliminate the same by pushing push button 34 in synchronism with the signal. Thus, in this instance, a low score will be indicative of a high degree of student ability.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. An apparatus for ascertaining the correctness of a student's pitch, comprising:

means for generating a musical sequence and audibly presenting it to said student;

means for generating a reference sequence of electrical signals corresponding to a sequence of pitches representative of a desired student's response to said audible musical sequence, said reference sequence and said musical sequence being simultaneously generated such that said reference sequence and said musical sequence are properly time related to provide a correct performance of said musical sequence and said reference sequence;

means for receiving a sequence of pitches performed by said student and generating a sequence of electrical signals corresponding thereto;

means for comparing said reference sequence of signals and said student performed sequence of signals continuously on a pitch by pitch basis; and means for instantaneously indicating on a pitch by pitch basis whether the frequency difference between said student signals and said reference signals is within predetermined limits, thereby indicating whether said student has correctly performed said sequence of pitches.

2. An apparatus as in claim 1 wherein said means for generating said musical sequence is a tape recorder playing one track of a tape and said means for generating said reference signals is said tape recorder playing another track of said tape.

* * * * *

UNITED STATES PATENT AND TRADEMARK OFFICE
CERTIFICATE OF CORRECTION

PATENT NO. : 3,919,913
DATED : November 18, 1975
INVENTOR(S) : David L. Shrader

It is certified that error appears in the above-identified patent and that said Letters Patent are hereby corrected as shown below:

Column 6, line 14, "36" should be --38--.

Column 6, line 32, "MPW" should be --NPN--.

Column 6, line 32, "84" should be --86--.

Signed and Sealed this

Twenty-third Day of November 1976

[SEAL]

Attest:

RUTH C. MASON
Attesting Officer

C. MARSHALL DANN
Commissioner of Patents and Trademarks